Aug. 28, 1951     M. G. LIPMAN     2,565,865
POULTRY VACCINATOR
Filed March 8, 1949
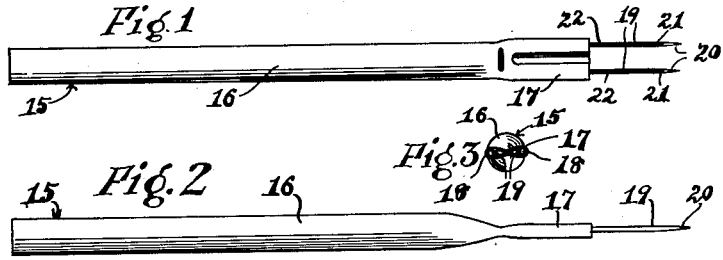
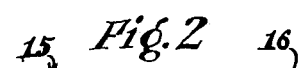
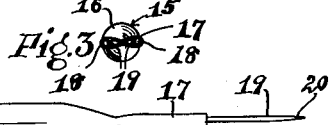
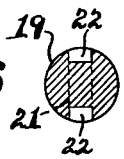
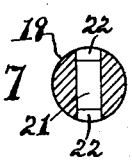
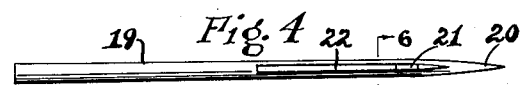
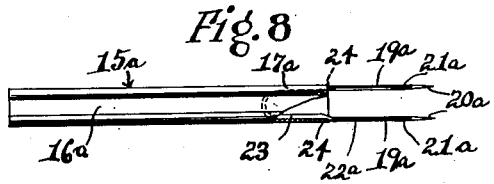
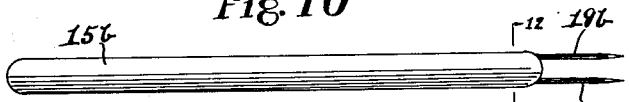
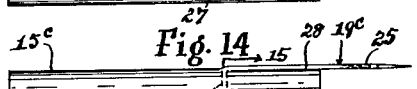
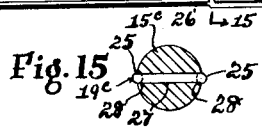
INVENTOR.
Michael G. Lipman
BY
W. W. Williamson
Atty.

Patented Aug. 28, 1951

2,565,865

UNITED STATES PATENT OFFICE 2,565,865

POULTRY VACCINATOR

Michael G. Lipman, Vineland, N. J.

Application March 8, 1949, Serial No. 80,177

9 Claims. (Cl. 128—253)

My invention relates to a new and useful poultry vaccinator and has for one of its objects to provide a device of this character which is simple in construction, relatively inexpensive in the cost of manufacture and highly efficient in operation.

Another object of the invention is to provide a vaccinator comprised of two needles, either as individual ones or a unitary structure, fixed in a suitable handle for easy manipulation and said needles having through and through apertures near the points to temporarily hold a vaccine and the surfaces of said needles being uneven so as to slightly rupture the flesh to assure a fully effective vaccination.

Another object of the invention is to produce an uneven surface on a needle by providing longitudinal grooves of appreciable length and communicating with the apertures.

A further object of this invention is to arrange the needles so that adjacent ends thereof, either the outer or inner ones, converge, whereby said needles are set oblique to one another which will cause a slight rupture of the flesh when the vaccinator is used to open up a fairly large area for the reception of the vaccine.

With the above and other objects in view this invention consists of the details of construction and combination of elements hereinafter set forth and then designated by the claims.

In order that those skilled in the art to which this invention appertains may understand how to make and use the same I will describe its construction in detail, referring by numerals to the accompanying drawing forming a part hereof, in which:

Fig. 1 is a plan view of a poultry vaccinator constructed in accordance with my invention.

Fig. 2 is a side view thereof at right angles to Fig. 1.

Fig. 3 is an end view of the same looking towards the pointed ends of the needles.

Fig. 4 is an enlarged view of one of the needles facing a groove.

Fig. 5 is a similar view with the needles rotated one-quarter turn.

Fig. 6 is a further enlarged sectional view on the line 6—6 of Fig. 4.

Fig. 7 is a similar view on the line 7—7 of Fig. 5.

Fig. 8 is a plan view of a modification with a portion of the handle broken away and shown in section.

Fig. 9 is an enlarged fragmentary view of the modified form of needle structure or unit.

Fig. 10 is a plan view of another modification.

Fig. 11 is an edge view thereof, and

Fig. 12 is an enlarged section on the line 12—12 of Fig. 10.

Fig. 13 is a side view of yet another modification.

Fig. 14 is a plan view at right angles to Fig. 13.

Fig. 15 is an enlarged section on the line 15—15 of Fig. 14.

In carrying out my invention as herein embodied, reference being first had to Figs. 1 to 6, inclusive, 15 represents a handle of any suitable material, fashioned to provide a handhold portion 16 and a crimped portion 17. The crimped portion 17 forms two sockets 18, Fig. 3, in which the shank ends of two similar needles 19 are fixedly assembled.

The handle 15 may be tubular or only the crimped portion hollow to receive the needles prior to the crimping operation or the crimped portion may be formed around the needles by a molding or casting process.

The needles 19 are spaced laterally and may be parallel to one another or mounted with either the inner or outer ends converging whereby they will be obliquely positioned relative to one another for the purpose of slightly rupturing or tearing the flesh during the time of insertion into a fleshy part of a fowl. These needles may be round, rectangular or of other shape in cross section and have sharp pointed outer ends 20 and one or more through and through holes 21 of any suitable outline are formed in or contiguous the pointed outer ends of both needles.

Each needle has opposed longitudinal grooves 22 of any appropriate cross sectional configuration formed in directly opposite faces thereof and communicating with the holes 21. Said grooves extend a short distance beyond or forward of the holes 21 and also an appreciable distance to the rear of said holes to or adjacent the needle shank, which is the portion fixed in the handle. The walls of the grooves where they join the circumferential surface of the needle provide one form of roughened surface to assist in rupturing or tearing the flesh to assure an effective application of the vaccine carried in the holes 21.

As illustrated in Figs. 8 and 9 the needles 19a are joined together in a unitary structure or as a unit by the U-shaped bridge 23 integral with said needles but having the legs of said bridge out of line with the needles to provide shoulders 24 that engage an end of the handle 15a. Said handle 15a includes a handhold 16a and a crimped portion 17a and some of the crimped portion may extend the full or a portion of the handhold portion. Like the previously described ones these needles are pointed at 20a and have one or more holes 21a and grooves 22a on both of two opposed sides and communicating with the holes.

The modification illustrated in Figs. 10, 11 and 12 includes needles 19b of either form previously described and have their inner ends embedded in the material of the handle 15b which, in this case, may be an elastomeric material of oval cross section. In any instance said needles have pointed ends and are provided with the holes and grooves.

The modification illustrated in Figs. 13, 14 and 15 comprises a handle 15c of wood, such as a short dowel, and the needles 19c are formed as U-shaped structure consisting of the two parallel prongs 25 joined by a bridge 26 located in a diametric hole 27 through the handle adjacent one end thereof. The needles are embedded in grooves 28 in opposite sides of the handles and said needles are pointed and provided with the longitudinal grooves and the holes the same as described in connection with the showing in Figs. 4 to 7, inclusive.

In the exercise of the invention, the needle structure is produced from bendable metal which is projected through the hole 27 in the handle, centered, then bent outward so that portions extend beyond an end of said handle, and finally pressed into the softer handle material for embedment therein and the formation of the grooves 28.

In practice, when a fowl is to be vaccinated the needles are dipped in a vaccine so that the latter will enter the holes in said needles where it will be retained until the needles are inserted in the flesh. As the needles are inserted, the flesh will be punctured and slightly ruptured and the vaccine deposited in the laceration where it will effectually impregnate the raw flesh or enter the blood stream to cause a "take." The rupturing action is caused by the needles puncturing the flesh and by the rough surface of said needles or the tearing action produced by the differences in the spacing of the opposite ends of the needles.

Of course I do not wish to be limited to the exact details of construction herein shown and described as these may be varied within the scope of the appended claims without departing from the spirit of the invention.

Having described my invention what I claim as new and useful is:

1. A poultry vaccinator comprising a pair of needles fixed in a handle and projecting from one end thereof, the outer ends of said needles being pointed and having through and through holes therein with longitudinal grooves in exterior opposed faces of each of said needles and communicating with the holes.

2. The structure according to claim 1 wherein the needles are parallel to one another.

3. The structure according to claim 1 wherein the needles are oblique to one another.

4. A poultry vaccinator comprising a handle, and a pair of spaced needles joined together by a bridge in a unitary structure with said bridge in an end of the handle, said needles having pointed outer ends and holes completely therethrough at the outer ends and further provided with opposed longitudinal exterior grooves and extending to the rear and forward of said holes with which said grooves communicate.

5. The poultry vaccinator according to claim 4 wherein portions of the bridge are offset from the needles to provide shoulders engaging the contiguous ends of the handle.

6. A poultry vaccinator comprising a handle having a crimped end to provide sockets, and a pair of needles fixed in said sockets, each of said needles having opposed longitudinal exterior grooves and through holes with opposite ends of the holes communicating with the opposite grooves.

7. A poultry vaccinator comprising a handle, and a pair of needles with pointed ends having their shanks fixed in one end of said handle, each of said needles having a roughened surface and a hole therethrough adjacent the pointed end to receive and temporarily hold a vaccine.

8. A poultry vaccinator comprising a wooden handle having a diametric hole therethrough adjacent one end with grooves extending from said hole to said adjacent end of the handle, a U-shaped needle structure including a bridge positioned in the hole in the handle and a pair of parallel prongs having portions occupying said grooves and projecting beyond said adjacent end of the handle, said prongs being pointed and having longitudinal exterior grooves and diametric holes.

9. The poultry vaccinator according to claim 8 wherein the handle is round in cross section and the grooves in said handle are produced by the pressing of the needle prongs into the handle material.

MICHAEL G. LIPMAN.

REFERENCES CITED

The following references are of record in the file of this patent:

UNITED STATES PATENTS

| Number | Name | Date |
|---|---|---|
| 786,000 | Botkin | Mar. 28, 1905 |
| 1,949,349 | Brown | Feb. 27, 1934 |
| 2,347,333 | Phillips | Apr. 25, 1944 |
| 2,359,550 | Eriksen | Oct. 3, 1944 |
| 2,445,010 | Thompson | July 13, 1948 |

FOREIGN PATENTS

| Number | Country | Date |
|---|---|---|
| 43,081 | Germany | Apr. 23, 1888 |
| 47,043 | Switzerland | Apr. 26, 1909 |